Figure 1:
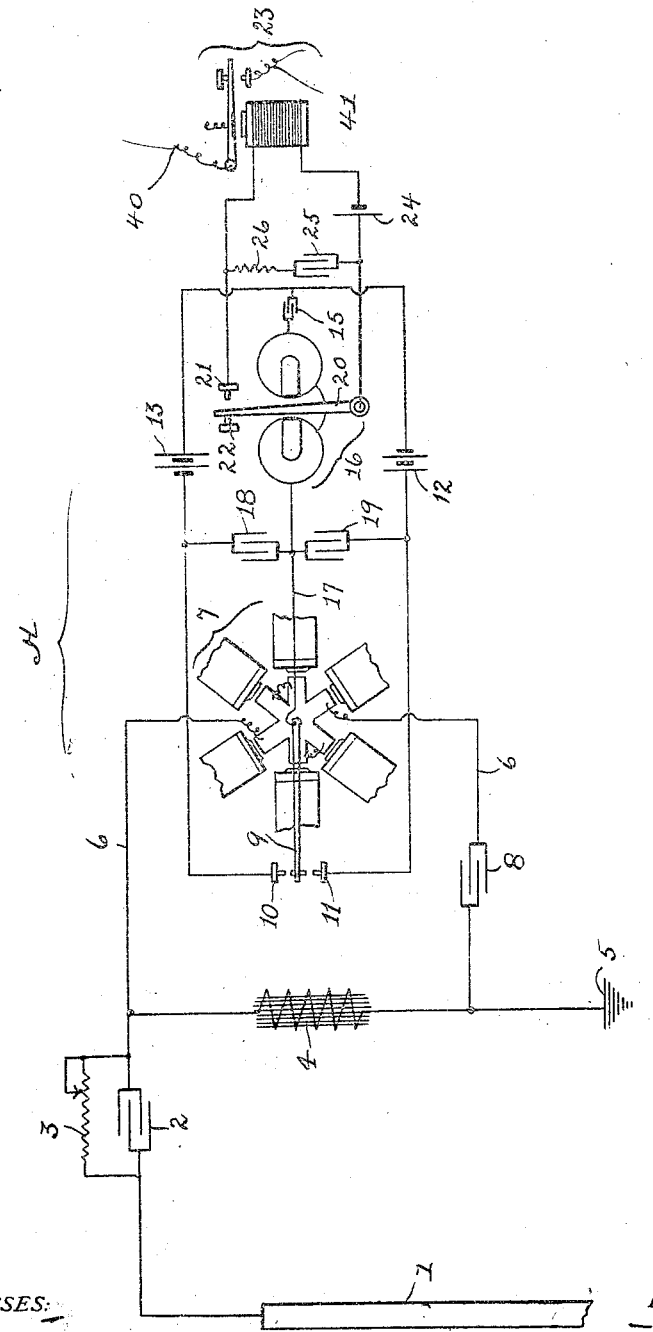

I. KITSEE.
CABLE TELEGRAPHY.
APPLICATION FILED JAN. 22, 1910.

1,097,030.

Patented May 19, 1914.
2 SHEETS—SHEET 2.

WITNESSES:

INVENTOR.

UNITED STATES PATENT OFFICE.

ISIDOR KITSEE, OF PHILADELPHIA, PENNSYLVANIA, ASSIGNOR, BY DIRECT AND MESNE ASSIGNMENTS, TO AMERICAN TELEPHONE AND TELEGRAPH COMPANY, OF NEW YORK, N. Y., A CORPORATION OF NEW YORK.

CABLE TELEGRAPHY.

1,097,030.    Specification of Letters Patent.    Patented May 19, 1914.

Application filed January 22, 1913. Serial No. 543,346.

*To all whom it may concern:*

Be it known that I, ISIDOR KITSEE, citizen of the United States, residing at Philadelphia, in the county of Philadelphia and State of Pennsylvania, have invented certain new and useful Improvements in Cable Telegraphy, of which the following is a specification.

My invention relates to an improvement in cable telegraphy. Its object is, to receive and translate impulses impressed upon a line with great capacity into sound or other record and automatically repeat the same.

In the accompanying drawing, I have illustrated the arrangement used by one of the largest cable companies for the purpose of receiving messages. To enable operators on cables to use this, my invention, and to duplicate the arrangement without further experiments, I will give here the exact data necessary to produce the desired results. I elect for this purpose to give the data as obtained in actual transmission over a cable from Canso, N. S., to New York, N. Y. This cable is of a comparatively old type and its resistance is, in comparison with the cables newly laid, very high. The line is, in round figures, 900 miles long; has a resistance of 8000 ohms and a capacity of 260 M. F., therefore, a K. R. of over 2,000,000. Newly laid cables have a resistance per mile of about 1.5 to 1.8 ohms.

I will first describe the arrangement as used at the receiving station at New York. This arrangement is clearly illustrated in Figure 1. In the cable is inserted a 7 M. F. condenser. This condenser is overbridged or shunted by a variable resistance of 100,000 ohms and it was found that the best results were obtained when the resistance had a value of 90,000 ohms. The cable was grounded with the interposition of an inductive resistance of 800 ohms.

The local arrangement includes the following:—A line relay of a type having movable coils, as is described in my application bearing Serial No. 476,849, and of exactly the value as described therein, and it has to be added that I used four amperes to energize the field coils. The tongue of the relay as well as the forward stops are provided with graphite contacts, as described in my application bearing Serial No. 506,612. This relay is connected in shunt to the inductive resistance with the interposition of a condenser having a value of 11 M. F. A relay of the Siemen's type, but the coil wound of No. 32 wire having a resistance of 2500 ohms, is connected to the line relay in the following manner:—The armature of the line relay connects with one terminal of the coil of the second relay, one of the forward stops of the line relay connects with the positive pole of a source of current and the other forward stop connects with the negative pole of a source of current; the sources of current are connected together. The second terminal of the Siemen's relay is connected to the junction of these two sources with the interposition of a condenser. As sources of current for each forward stop, two small secondary batteries are used giving as usual four volts on open circuit. The condenser between the Siemen's relay and conjunction of batteries has a value of four microfarads. Each of the batteries is shunted with a condenser of one-fourth of a microfarad. To the Siemen's relay is connected a four ohm sounder in the following manner:—The armature of the relay is connected with the interposition of one secondary battery to one terminal of the coil of the sounder and one of the forward stops is connected to the other terminal of said coil. The battery is shunted through one-fourth of a microfarad and twenty ohms resistance. This is the exact duplication of the arrangement as used in telegraphing over the so-called Canso cable.

Figure 2:
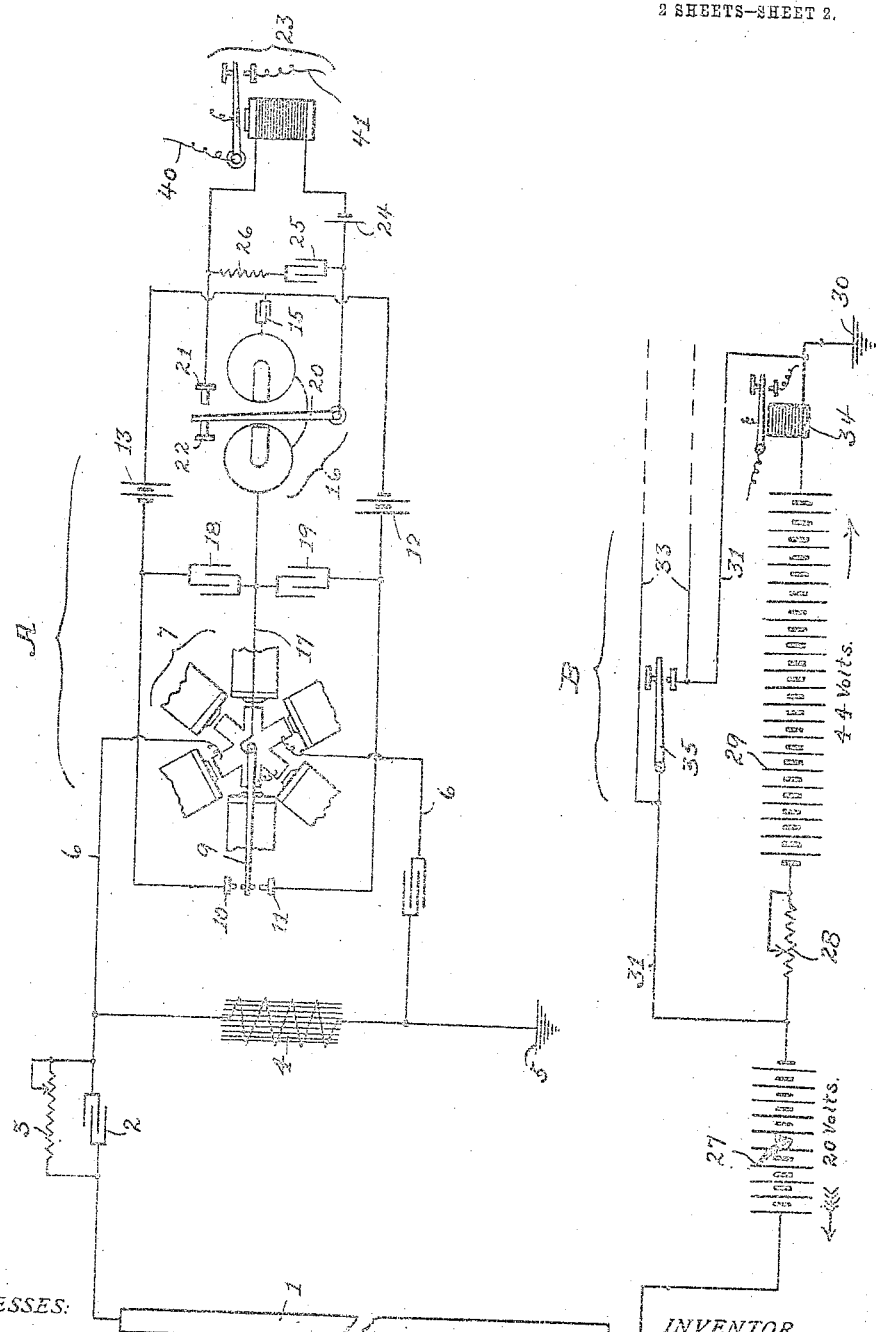

At the transmitting end, at Canso, the arrangement was used, as is illustrated in Fig. 2. It has to be stated that if the transmitting key is replaced by what is technically known as the "Wheatstone transmitter", then the voltage is increased to forty against eighty-six. At this transmitting station, two sources of currents were directly inserted in the line; one source shown as twenty volts connected with the positive pole to the cable, and the other source, shown as forty-four volts, connected with the negative pole to the cable and with the positive pole to the ground. A resistance is inserted in the cable near the negative pole of the second source. This resistance has a value of fifty ohms, but it may be stated that the value of this resistance should be increased with the increase of the voltage of this source, and the ohmunit of resistance should always be higher than the number of volts. When the number of volts reaches eighty six, then the resistance should be at least ninety, but it is preferred that the resistance should then be, in round figures, one-hundred ohms. A too low resistance results in too great a sparking and heating of the contact points. In proximity to the resistance is placed a low wound sounder. I have found it best to make the resistance near the source a variable one, when the batteries are increased or decreased in accordance with the required speed, the same resistance may be used and varied in accordance with requirements. The second source, with its resistance and sounder, is provided with a shunt and the shunt is provided with an ordinary transmitting key. The shunt is also provided with two wires which connect with the automatic Wheatstone transmitter,—an instrument well known by telegraph operators and not requiring any further description. The wire connecting the automatic to the shunt is provided with a switch. With this system, the operator at Canso, N. S. transmitted messages at different speeds, the highest speed with the key being a spurt of thirty five words per minute. The message was received with the aid of a sounder and was relayed with this aid to a second instrument. This instrument and relaying circuit does not need to be described.

In the drawing, similar parts are indicated by similar letters.

In Fig. 1, A is the receiving station as an entirety; 1 is the cable grounded at 5 with the interposition of the resistance, here shown as an inductive resistance 4. Between the cable and the ground wire is inserted the condenser 2 overbridged by the resistance 3. The resistance 4 is provided with the shunt wire 6 and in this shunt are connected the coils of the relay 7 and the condenser 8; the coils and condenser in series with each other. The line relay 7 is provided with the tongue 9 and the forward stops 10 and 11. 12 and 13 are two sources of current connected together with their opposite poles. In reality, these two sources form, what is technically known as a "split battery." The source 13 connects with the negative pole to the forward stop 10 and the source 12 connects with the positive pole to the forward stop 11. 16 is a second relay; the coil of this relay is connected with one terminal to the tongue 9 of the first relay and with the second terminal to the condenser 15. This condenser connects with the junction of the two batteries just mentioned. 18 and 19 are two condensers overbridging the circuits containing the sources 13 and 12, respectively. The relay 16 is provided with the tongue 20 and the forward stops 21 and 22. 23 is a translating device here shown as a sounder; the coil of this sounder is connected at one terminal with the interposition of the battery 24 to the armature 20 and with the other terminal to the forward stop 21. 25 is a condenser and 26 a resistance overbridging the circuit of the coil. The sounder 23 is here provided with the wires 40 and 41 for the purpose of repeating or relaying the message to other circuits.

In Fig. 2, B is the transmitting station as an entirety comprising here the two sources of current 27 and 29, the variable resistance 28 inserted between said sources; the sounder 34 and ground 30. The source 29 is here provided with the shunt wires 31, the transmitting key 35 and the wires 33 adapted to connect the shunt to automatic transmitting devices. In this drawing, the source 27 is shown as to consist of cells of twenty volts potential and the source 29 as to consist of cells of forty four volts, but it is obvious that the number of volts may be increased or decreased in accordance with requirements.

It is supposed that as a means to transmit messages, the transmitting key 35 is used. Normally, when the key is open, a current will flow from the battery 29 over the line in the direction of the unfeathered arrow. When the operator closes the key, the source 29 is short circuited and the current will flow over the line from the source 27 in the direction of the feathered arrow. The operator, therefore, transmits for each character of the alphabet two pulses;—one pulse when the key is closed and one pulse when the key is open; the pulses of opposite polarity. A dash is represented, as usual, by the longer depression or closing of the key and a dot by the shorter depression or closing of the key. At the receiving station, the arrived impulse from the battery 27 drives the tongue 9 of the relay 7 toward and in contact with—say—stop 10 and the closing of the circuit through battery 13 results that the tongue 20 of the relay 16 moves toward and in contact with stop 21 closing the circuit including the sounder 23. The opening of the key at the transmitting station drives the tongue 9 of relay 7 in contact with stop 11, thereby driving the tongue 20 of relay 16 in the opposite direction and breaking the circuit including the sounder 23.

I have here shown the system of—what I call—"true reversals" as the means to transmit impulses over the line, but it is obvious that the receiving means may be used with different transmitting means.

Without wishing to formulate a theory and for the information of persons desiring to accomplish the objects set forth, I add the following:—At first glance, it would seem to the operator versed in cable telegraphy that the small capacity of the condenser 2, unnecessarily lowers the value of the incoming impulse, but careful experiments have proven the fact that if a condenser of greater capacity is inserted in the cable, the fluctuations in this condenser allow a fluctuating current to flow through the relay-shunt; and it was also found that a condenser of a small capacity fills entirely even through the weak impulses arriving and is proof against the greatest part of—what is called—the "shifting of the zero." The function of the resistance 4 is to further cut down the variations of the separate impulses and here it was found that if the resistance is inductive, the so-called "back-kick" greatly facilitates the clear handling of the line relay.

The condenser in the shunt 6 is required for the purpose of lengthening the effect of the incoming impulse and for this reason it was found that it is best if this condenser has a greater capacity than the cable condenser. The condenser 15 is inserted between the coil of the Siemen's relay and the circuit connecting the same to the line relay, for two reasons:—1st:—A Siemen's relay wound to 2500 ohms and delicately adjusted easily loses its normal or zero position when currents of different variations and lengths are sent through it. 2nd:—No matter how largely the effect of the moving zero is overcome by the arrangement, the pressure of the tongue of the line relay on the contacts of its forward stops nearly always varies in degree; and in actual working, it was found that these disadvantages produce in the translating device 23 a "wavy like" response, the downward stroke not being clear cut and sharp, and the insertion of the condenser 15 overcomes this difficulty entirely because this condenser allows only an impulse of restricted duration to pass the coil, no matter how long the tongue of the line relay connects with its forward stop.

In conclusion, I will state that in the line relay used in conjunction with the transmitting arrangement, as illustrated in Fig. 2, the spiral spring is discarded, as the coils will stand at zero if no current is transmitted over the line, and the working of this relay to the right or left is more easily accomplished without the spiral springs, but it is recommended that where a mode of transmission is employed in which the polarity of the impulse designates the character, the spiral spring should be re-instated.

Having now described my invention, what I claim as new and desire to secure by Letters Patent is:—

1. In cable telegraphy, a receiving arrangement comprising the following instrumentalities: an impedance, a shunt for said impedance, an electromagnetic relay with armature and contact stops and connected in said shunt to the impedance, a local circuit for said armature and contact stops, a polarized relay in said local circuit, a source of current for each side of said circuit, a sounder, and a local circuit connecting said sounder to said polarized relay.

2. In cable telegraphy, a receiving organism comprising a shunted condenser and inductive resistance inserted in series as to each other and to the cable, a local circuit and receiving instrument and a free condenser, the receiving instrument and condenser in series as to each other and said local circuit, said circuit in shunt to said resistance.

3. In a receiving organism for cable telegraphy, two polarized relays, one of said polarized relays operatively related to the cable proper, the second of said relays connected with one terminal to the tongue of the first relay and with the other, with the interposition of a condenser to a circuit containing two sources of current, one pole of each of said sources connected to one of the forward stops of the first relay.

4. In a receiving organism for cable telegraphy, a line relay and a local relay, a circuit operatively connecting said two relays to each other, said circuit comprising the following elements:—two sources of current, one source connected with the negative pole to one of the forward stops of the line relay, the second of said sources connected with the positive pole to the second forward stop of said line relay, the other poles of both of said sources connected together, a condenser connected with one terminal to the junction of said two sources and connected with the other terminal to one terminal of the coil of the local relay, the second terminal of said coil connected to the tongue of the first relay; two condensers, one condenser overbridging the circuit of one of the sources of current and the second overbridging the circuit of the second of said sources.

5. In a receiving organism for cable telegraphy, a line relay and a local relay, the line relay provided with movable coils, the coils of the local relay stationary, a circuit operatively connecting said two relays to each other, said circuit comprising the following elements:—two sources of current, one source connected with the negative pole to one of the forward stops of the line relay, the second of said sources connected with the positive pole to the second forward stop of said line relay, the other poles of both of said sources connected together; a condenser connected with one terminal to the junction of said two sources and connected with the other terminal to one terminal of the coil of the local relay; the second terminal of said coil connected to the tongue of the first relay; two condensers, one condenser overbridging the circuit of one of the sources of current and the second overbridging the circuit of the second of said sources.

6. In a receiving organism for cable telegraphy, a line relay, a local relay and a translating device, the line relay connected in shunt as to part of the cable circuit; the local relay connected with the interposition of a condenser to the line relay and the translating device connected to said local relay.

7. In a receiving organism for cable telegraphy, means to overcome the shifting of the zero, said means comprising a shunted condenser and inductive resistance inserted in series as to each other and the cable, a ground for said cable and a shunt around said resistance, said shunt embracing a free condenser and a line relay.

In testimony whereof I affix my signature in presence of two witnesses.

ISIDOR KITSEE.

Witnesses:
 EDITH R. STILLEY,
 MARY C. SMITH.